Jan. 23, 1951   R. F. ZIMMERMAN ET AL   2,538,891
CONTINUOUS MIXING AND DELIVERING APPARATUS
Filed Feb. 19, 1948   2 Sheets-Sheet 1
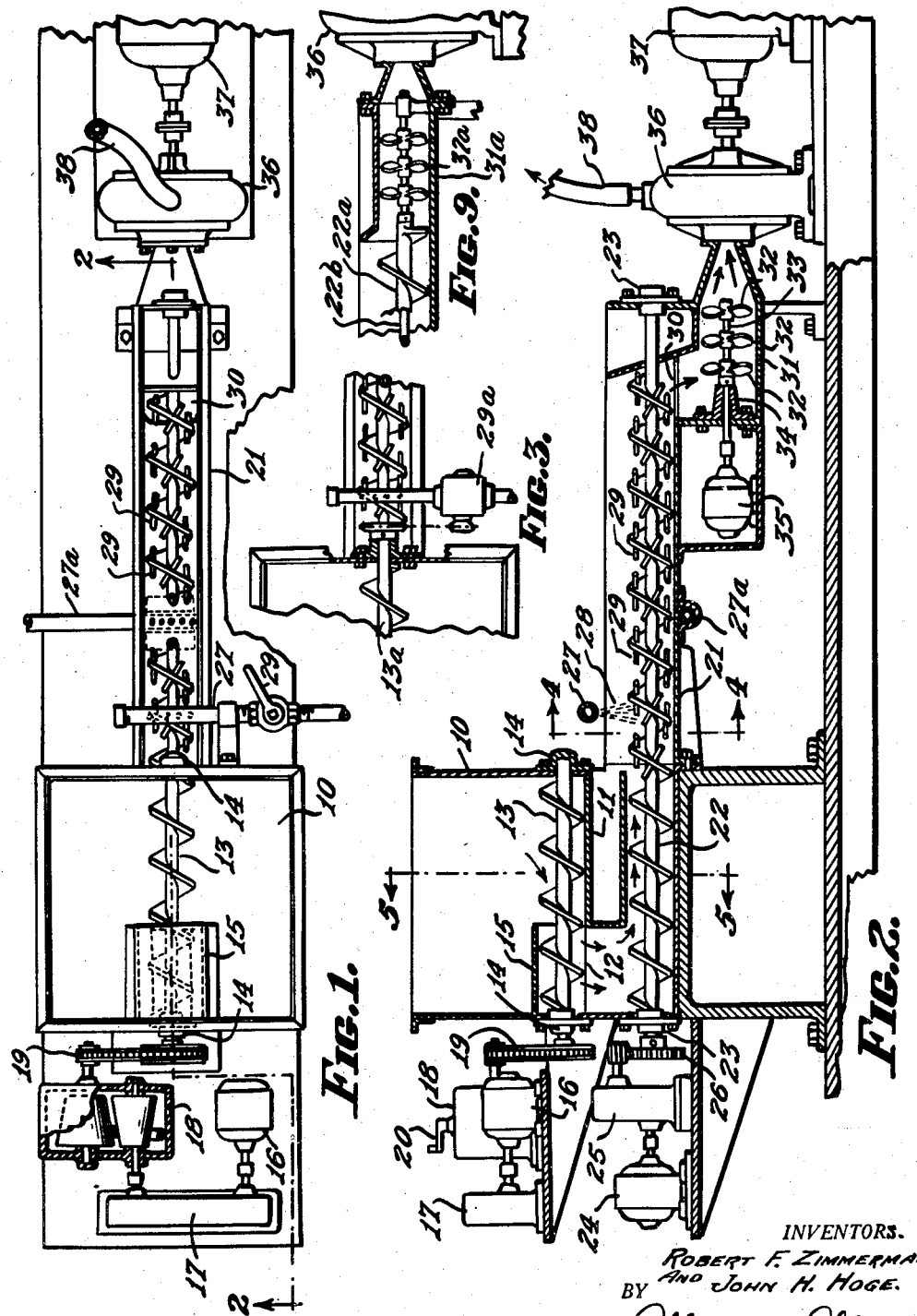
INVENTORS.
ROBERT F. ZIMMERMAN
AND JOHN H. HOGE.
BY Allen & Allen
ATTORNEYS.

Jan. 23, 1951 R. F. ZIMMERMAN ET AL 2,538,891
CONTINUOUS MIXING AND DELIVERING APPARATUS
Filed Feb. 19, 1948 2 Sheets-Sheet 2

INVENTORS.
ROBERT F. ZIMMERMAN
AND JOHN H. HOGE.
BY Allen & Allen
ATTORNEYS.

Patented Jan. 23, 1951

2,538,891

UNITED STATES PATENT OFFICE 2,538,891

CONTINUOUS MIXING AND DELIVERING APPARATUS

Robert F. Zimmerman and John H. Hoge, Cincinnati, Ohio, asssignors, by mesne assignments, to Hoge Warren Zimmerman Co., Cincinnati, Ohio, a partnership Application February 19, 1948, Serial No. 9,435

19 Claims. (Cl. 259—10)

This invention relates to a process and apparatus for the continuous mixing and delivering of materials, and while it is adaptable to the continuous mixing and delivering of many other materials it is particularly advantageous in the continuous mixing of dry calcined gypsum, with or without fiber added, and water, which when mixed together form a gypsum slurry, which slurry, upon crystallization forms a cementitious material known as gypsum composition used in the construction of preformed or monolithic structural slabs, insulating blocks, fills, coatings and the like.

Ever since gypsum has been used for purposes such as described herein, it has been prepared for use in the field and factory by one of a number of batch processes. A conventional process which has been in use for some forty-five years, and which is still most prevalent today, involves the use of a mortar box and a mixing hoe. Water is first introduced into the mixing box and then bags of gypsum are simply cut open and dumped into the water while a laborer mixes the materials with a hoe. In this process the first dry gypsum to enter the water is provided with a large excess of water of crystallization, and crystallization of the first batch begins under ideal conditions. As each succeeding bag is dumped into the water in the mortar box there is less excess water for crystallization, so that the crystallization of the gypsum from succeeding bags not only starts later in point of time, but proceeds at a slower rate. If four or five bags of gypsum are added, it is clear that the last bag must be very thoroughly mixed in order that it may be brought into contact with its necessary water of crystallization.

A batch of gypsum mixed as just described really consists of four or five batches, each of which is at a different stage in the crystallization process so that the batch as a whole is not homogeneous. Even though the batch be mixed as thoroughly as possible for the limited time before setting begins, if it be dumped out on the ground and turned over somewhat with a hoe, large clumps of substantially dry gypsum will be encountered. Of course, as other parts of the batch proceed with their crystallization the excess of water from those parts will ultimately wet the dry clods, but the final product when set up is definitely not uniform or homogeneous. It has a very poor structural strength, in comparison to the potential strength which it would have had, if it had been thoroughly and homogeneously wetted and mixed. This becomes obvious after a study of the cross section of hand poured material and its lack of uniformity in the crystalline structure, resulting from an uneven growth of the crystals, and their inability to join on their optimum planes which of course tends to create voids, and results in uneven distribution of tensile and compressive stresses throughout the mass.

In addition to the manual method described above, gypsum has recently been mixed by machines, but still in a batch process. According to one process there is provided a cylindrical container having rotating agitator blades or rods at the bottom. A pipe encircles the cylinder at the top and is provided with a number of orifices through which the water is added, followed by one bag of dry gypsum. When one batch is mixed, in the judgment of the operator, a gate at the bottom is opened and the mixed product flows out. Then another batch is mixed.

Yet another machine has comprised a motor driven beater mounted on a tilting stand by means of which a batch of water and gypsum was beaten up in a deep wheelbarrow or the like, which was brought under the machine. When one wheelbarrow full was mixed, that barrow was rolled away and another barrow brought under the machine. This machine might be compared to the conventional soda fountain milk shake mixers.

The last two described processes made the mixing operation quicker, but did not overcome the faults of the hand batch mixing process. The individual batches could not be made perfectly uniform and homogeneous, and furthermore there was always a variation from one batch to the next because the matter of quantities of ingredients used and length of mixing time were dependent on the judgment of the operator.

Gypsum as mined is in a hydrated state ($CASO_4 \cdot 2H_2O$). Its refinement, effected by calcining, requires heat, and drives off moisture to produce ($CASO_4 \cdot \frac{1}{2}H_2O$) or dry calcined gypsum. To produce gypsum composition from this material, sufficient water is added to recrystallize it to its original form $CASO_4 \cdot 2H_2O$. This endothermic reaction liberates heat of crystallization. In turn, the presence of the liberated heat progressively accelerates the crystallization reaction. This reaction is very comparable to that which takes place when plaster of paris is mixed and sets.

The setting time of dry calcined gypsum to which the necessary water of crystallization has been added varies somewhat, depending upon the way in which it is mixed, depending upon the use of retarders and accelerators, and depending upon the atmospheric conditions. With hand mixing setting usually begins about four minutes after contact with water and continues progressively until the material is completely hardened in ten to fifteen minutes. Generally the material is unworkable with ordinary tools of the trade after five to six minutes. In view of this relatively rapid time of setting, the mixing process must be carried out as quickly as possible in order that the equipment will not become fouled with gypsum which has begun to set.

It is one of the prime objects of this invention to capitalize so to speak, on the effect of the liberation of the aforementioned heat, released by the reaction. It has been found that when a constant and continuous reaction is maintained, such as results from rapidly and continuously mixing calcined gypsum and the optimum amount of water, then the reaction will proceed at the maximum speed and accordingly will release the maximum amount of the available heat to be liberated in the minimum of time. Inasmuch as the reaction is continously maintained, then its temperature is constantly and continuously at its maximum. And as the presence of heat accelerates the setting or crystallization time of gypsum, it follows that the setting time is accelerated to the possible maximum at all times, only in a continuous process, or in very small batches.

In this continuous process of preparing gypsum for use, it is possible by virtue of the physical action of the apparatus to continuously entrain relatively large quantities of air, very uniformly distributed throughout the mix. The air is supplied by various means mentioned hereinafter. Due to the accelerated setting action, also effected only by this continuous apparatus and process, a much larger proportion of the air entrained, in the form of small bubbles, is captured, than is possible in any of the slower setting batch processes. The resulting poured structure is lighter, more uniform in its texture and possesses a higher insulating value. Furthermore these qualities can be varied at will to suit a wide range of specifications. In addition the accelerated crystallization or setting greatly expedites the work or processes being carried on, such as the pouring of a monolithic gypsum slab, or fill, or block or the like, because of the shorter time necessary for the poured structures to become self sustaining or capable of load bearing.

In connection with the rapid setting time of gypsum must be considered its adhesive properties. If the gypsum is mixed to a thick consistency it may act like a layer of damp putty and adhere to a surface simply because it is not fluid enough to flow off. These adhesive properties are not so much true adhesive properties such as are found in glues or resins, but a property whereby gypsum in setting will form a structurally strong film or plating on a surface no matter how smooth, unless that surface is subject to a fairly constant washing. Once such a film or plating begins to form, it acts as a blotter in soaking up gypsum from succeeding streams of unset material, holding a new layer which then sets at an accelerated rate. Because set or hydrated gypsum is a very effective accelerant, its presence as film or plating on surfaces in or adjacent the newly mixed material produces great irregularity in setting time, with consequent difficulties to the workmen who are finishing the material. This is an inherent difficulty in any batch process, since it is nearly impossible to keep the entire batch entirely mobile at all times. Continuous mixing eliminates this difficulty.

Since, in any batch mixing process, the time required to thoroughly and completely mix the entire batch must be deducted from the total setting time, leaving less time for the transporting, working and forming of the gypsum for monolithic structural roof decks, it has generally been necessary to do all mixing as near as possible to the point of use, unless retarders were introduced to permit more time in transit. The use of retarding agents, however, introduces so many elements of uncertainty that it is highly undesirable. The close proximity of the mixing operation to the work area results in heavy traffic therein, scattered empty bags, tools, hose etc. and the presence of scattered gypsum dust and splashing, all of which make for extremely messy working conditions. Obviously this makes it difficult to apply protective waterproof roofing close behind the work, with the resultant danger of damage to the deck from rain or freezing. This difficulty, inherent in batch mixing, could have been eliminated if it had been practical or possible to pump the mixture which heretofore has never been accomplished on a commercial scale. Heretofore, pumping of mixed gypsum slurry has not been practical, primarily because batch mixes, produced either by the manual box method or mechanical batch method, have been unable to produce a consistency of mixture sufficiently uniform, and free of lumps, and dry unmixed material, that it would pass through a pump and hose line. A pumpable mixture must be of a creamy, uniform texture.

In the case of batch mixing by hand, as previously noted, approximately three of the four minutes before setting begins are consumed in mixing, which leaves about a minute for pumping the mixture to its destination, before setting begins. Obviously to prevent setting up of material in the hose line the line must be short, thus becoming impractical.

The mechanical batch mixing machines have reduced mixing time to one minute or less, and have produced a better mixture than the hand process, as regards consistency and thoroughness. However, the flow of mixed material from any batch mixing process is intermittent in relation to the pump and transmission lines from the pump to destination. This intermittent flow of batches has made it impractical if not impossible to pump gypsum slurry prepared in this way, because immobility of the mix will allow it to plate cumulatively, and small portions of it to set in transit through the system. This material acts as an accelerant to the setting of following material and eventually the system will clog with set material, thus halting the process.

Frequent periodic cleaning out of the system is a costly process and it practically offsets any monetary savings contemplated by the use of any batch mixing process used in conjunction with a pump.

In contrast, the continuous mixer as described effects a creamy, even texture to the gypsum slurry, mixes it in 2 to 4 seconds, and delivers it to the pump in a continuous flow that makes the pumping possible. And even though the setting time in this process is deliberately expedited, as previously noted, sufficient time is available before setting begins to make it possible to use long enough hose transmission lines to make the entire process practical.

A continuous process is much easier to work with than a batch system. It proceeds at a steady pace, without stop-start jerkiness. It makes better workmanship possible because of the rhythm and pace, and the greater uniformity of the mixed material. Less fatigue to the workmen results from continuous effort expended over 2 to 3 times as long a period as the same quantity dumped suddenly from a batch would require. There is much less danger of accidental setting of the gypsum, either in the equipment or on the slab, since the gypsum is delivered to the work point more rapidly after mixing.

It is well known that the speed and thoroughness of a mixing operation increases as the batch amount becomes smaller, until, in a continuous process infinitely small batches are mixed in infinitely small periods of time. The result is that any two adjacent crystals at any point in the mixture, begin their crystalline growth at practically the same time (an immeasurable fraction of a second apart) and therefore their growth is even until they have interlocked with each other. The result is a continuous mass of crystals all uniform in size, and theoretically all uniting with each other along their optimum crystalline planes. Thus the stresses in compression and tension are distributed between the crystals equally in accordance with mechanical laws, as distingushed from the random crystallization produced in a batch operation. Quite apart from the vast improvement in crystalline structure heretofore discussed, is the factor of thoroughness of mixing which permits no dry material to remain in the mixture, while at the same time any wood or other fibrous binder is evenly distributed throughout the mass. With the elimination of such "dead" spots, it is not necessary to have such a high safety factor in computation of load bearing stresses.

With the foregoing considerations in mind it is an object of our invention to provide a process for continuously mixing calcined gypsum and water, to form a gypsum slurry, for use and continuously delivering it to the point where it is to be used. In this connection it is another object of our invention to provide a machine for continuously delivering the proper amount of water of crystallization to calcined gypsum or other liquids to other materials and to deliver the prepared material ready to use.

It is another object of our invention to provide a hopper for the dry material, having means for continuously delivering the dry material at any uniform rate. It is another object of our invention to provide means for moving the dry material along a path and creating in the dry material a state of high turbulence or agitation.

It is yet another object of our invention to provide for the addition of water of crystallization to the dry calcined gypsum, or other liquids to other dry materials while they are in a state of high turbulence and to provide for the addition of the water or other liquids by means of jets or sprays.

Our objects further include the maintenance of the mixed material in a state of turbulence or agitation whereby to insure that substantially each particle of the calcined gypsum will quickly come into contact with the water of crystallization necessary to it, whereby to produce a homogeneous and uniform mix, thereby providing for a uniform crystalline growth.

Again it is an object of our invention to cause free air to be injected into and be beaten into the mix so that a slab or other formation poured from the mixed material will be characterized by a uniform, fine, porosity so that the resultant slab will have enhanced insulating properties, in addition to a lower density.

Our objects also include the provision of means whereby the mixing can be accomplished on the ground or at a remote location and the mixed material may be continuously pumped to the place where it is used.

These and other objects of our invention which will be pointed out in more detail hereinafter, or which will be apparent to one skilled in the art upon reading these specifications, we accomplish by that series of process steps and by that construction of which we shall now describe certain exemplary embodiments.

Reference is made to the drawings forming a part hereof and in which:

Figure 1 is a plan view of a machine according to our invention.

Figure 2 is a side elevational view of the same with parts in section on the lines 2—2 of Figure 1.

Figure 3 is a fragmentary plan view of the wetting station showing a modification.

Figure 9 is a fragmentary cross-sectional view similar to the right hand end of Figure 2, showing a modification.

Briefly, in the practice of our invention we continuously move calcined gypsum or gypsum slurry along a path which may be a trough or a tube and at the same time violently agitate the same to produce a high degree of turbulence, and we add water of crystallization to the material while in such a state of turbulence by means of water jets of suitable pressure. We continue the agitation after the addition of the water to insure a thorough mixing so that substantially each particle of the gypsum is brought into contact with its required water of crystallization almost instantly, and whereby the air is entrained in the mix and uniformly distributed therethrough in the form of minute bubbles. At this point it is our purpose to further supplement the amount of air entrained into the mix by the water jets, by the addition of high pressure air jets. This also would be done in case our water supply was not available at sufficiently high pressure to insure the proper amount of entrained air. We preferably carry on the mixing on the ground and pump the prepared mix, or convey it in any desired manner, to the roof or other place where it is to be used, so that the litter and mess heretofore associated with gypsum work is eliminated. We do all this continuously so that the work on the deck may proceed without interruption at a uniform pace, and whereby continuous motion of the mix flushes the surfaces which are in contact with the mix to prevent any incipient filming or plating which would quickly foul up the machine.

Figure 4:
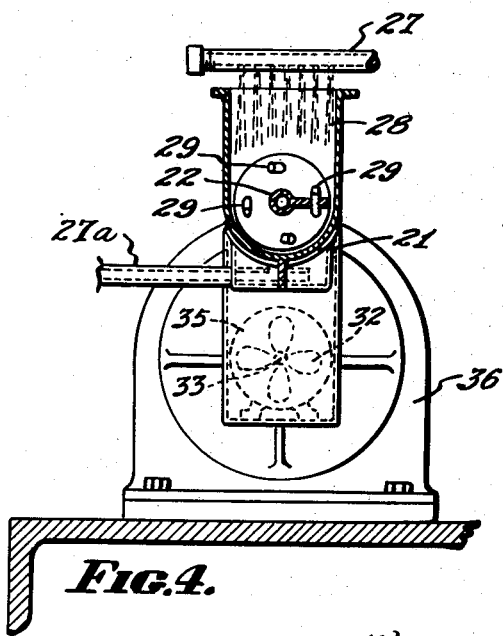
Figure 4 is a cross-sectional view on an enlarged scale taken on line 4—4 of Figure 2.
Figure 5:
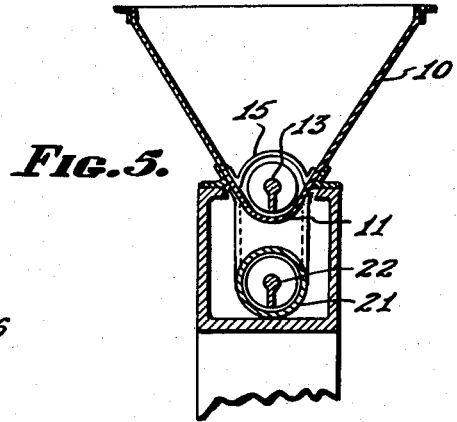
Figure 5 is a fragmentary cross-sectional view taken on line 5—5 of Figure 2.

Referring now more particularly to the drawings, we have shown at 10 a hopper into which the calcined gypsum is dumped. As best seen in Figure 5 this hopper is trough shaped at the bottom as indicated at 11, and is provided with an aperture 12 for the delivery of the dry material. In the trough 11 we mount a feed screw, or other feeding means, 13, as for example in bearings 14, and we shroud that portion of the trough which is above the delivery opening 12, as indicated at 15. The screw 13 may be driven in any conventional way by a motor 16, for example through a speed reducer 17, a variable speed drive 18 and a chain and sprocket drive, or the like 19. A handle 20 is provided for adjustment of the variable speed drive 18. Thus the speed of the screw and in consequence the quantity of material delivered per unit of time may be controlled at will.

Beneath the hopper we provide a trough indicated generally at 21, into which the dry material falls from the delivery opening 12. The dry material is moved along the trough 21 by means of a mixing screw 22 which may be mounted in bearings 23, as shown. The screw 22 may be driven by a motor 24 through a speed reducer 25 and the gearing 26.

It will be noted that the lefthand portion of the screw 22 as seen in Figure 2 has only a feeding function and feeds the dry material toward the right from the delivery opening 12, toward the wetting station which may be indicated by the pipe 27, which may be located at any desired point along the entire length of the screw as the need indicates. The correct flow of water of crystallization is brought in through the pipe 27 and issues into the trough 21 in the form of a series of jets or sprays 28, and the amount of water added may be controlled by a valve as at 29.

In Figure 3 we have shown a modification in which the valve 29a is coupled with the screw 13a so that the speed of the screw 13a controls the degree of opening of the valve. In this way the amount of water added is based on the weight of calcined gypsum being moved along the conveyer.

In order to create the aforementioned state of turbulence and agitation, we provide the flight of the screw 22 with means to produce agitation. By way of example we have shown the pins 29, which extend on both sides of the flight and are substantially normal to the plane of the flight at that point. These pins are arranged so as not to touch each other as will be clear from an inspection of the figures. It will be observed that the pins 29 commence in advance of the wetting station 27 so that as the dry material moving toward the right in Figure 2 along the trough 21, emerges from beneath the hopper itself, it is being violently agitated and fluffed up. Shortly after this the water is added in the jets 28 to the turbulent dry material whereby the dry material and the water are thoroughly intermixed and whereby in fact each particle of the gypsum is brought into contact with its necessary water of crystallization. The fluffing up produced by the action of the pins 29 aerates the material and air is also entrained in the sprays or jets 28. The material beyond the wetting station to the right in Figure 2 is in a wetted state and during this further movement to the end of the trough it is being further and continuously agitated so as to insure a thoroughly homogeneous and uniformly finely aerated material. Thus the screw 22 has both a feeding and an agitating action. At 27a are located compressed air jets for introducing free air into the wetted mixture. This air supply supplements that furnished by entrainment in the water previously introduced.

In the embodiment shown in Figures 1 and 2 an aperture 30 is provided in the bottom of the trough at its right-hand end, and the mixed material drops through the aperture 30 into a conduit 31. In this conduit, which also constitutes a reservoir, the material is given a further beating for the purpose of breaking up any large air bubbles and insuring that the aeration is uniform and fine. This may be accomplished by a series of propellerlike blades 32 mounted upon a shaft 33 having a bearing at 34 and driven by a motor 35.

In Figure 9 we have shown a modification of the right hand end of the machine of Figure 2, which the propeller-like blades 32a are arranged coaxially with the screw 22a, in a conduit or reservoir 31a which in this case is an extension of the mixing path or trough. The screw 22a has a hollow shaft, and the blades 32a are mounted on the shaft 22b which rotates within the shaft 22a. In this way the blades 32a may be driven at a higher speed than the screw 22a.

Mixed gypsum slurry has heretofore been considered incapable of being pumped. We have found, however, that the material mixed according to our machine is of such characteristics that it may be pumped, and we have shown the conduit 31, which also serves as a reservoir, leading to a pump 36 driven by a motor 37. The pump 36 may be a commercial so-called "open impeller" paper stock pump or the like, and the material is pumped by the pump 36 through a hose 38 to the point where it is to be used. The pump must be oversized, because when pumping gypsum slurry, it will deliver not more than one-fifth of its water rating. It must be free of restricted passages and abrupt changes in direction of flow. These considerations apply also to conduits or hoses used in the operation.

By virtue of the fact that our mixed material is completely uniform and by virtue of the fact that it is a continuous process, each minute element of the mixed material passing any given point of the machine is at the same stage of the crystallization process. There is always an excess of water which serves to flush the interior surfaces of the pump and the hose, so as to prevent any incipient plating or film forming on the part of the gypsum. In practice, at the conclusion of an operation we stop the feed of the dry material by shutting off the motor 16, and we continue the application of water to flush out any remaining mix in the machine or the hose.

Usually gypsum composition in which wood fiber is already blended with the calcined gypsum is used in a process of laying roof decking or the like. According to our invention however it is possible to use pure calcined gypsum and wood fibers or the like separately, and to blend them on the spot in any desired proportion. Thus we have shown in Figure 6, a modification of the hopper of our machine in which the hopper 10a is divided at 10b to provide two (or more) troughlike portions 11a. In each one of these troughs 11a we provide a screw 13a, or other feeding means, and each of these troughs has a shrouded portion 15a. Both have delivery openings leading to a trough 21a in which a screw 22a operates. It will be clear that the screws 13a can be driven at the same speed, or at different speeds, so as to feed out material in the two sides of the hopper into the common trough 21a in any desired proportion. Thus, pure calcined gypsum can be fed into one side of the hopper and wood fibers or any other desired material can be fed into the other side of the hopper and the drive for the feeder screws 13a can be adjusted to feed into the trough 21a the two materials in any desired proportion.

Figure 6:
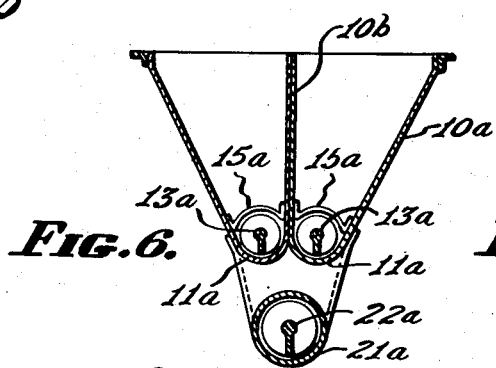
Figures 6 and 7 are views similar to Figure 5 showing modifications.
Figure 7:
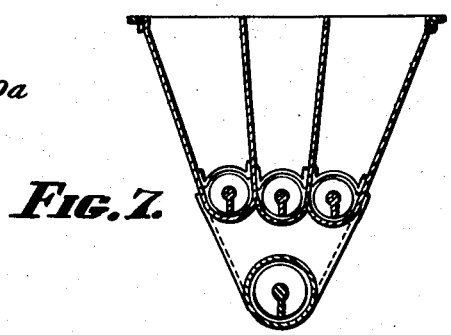

In Figure 7 we have shown an arrangement similar to Figure 6, but in which the hopper is divided into three portions each portion having its own screw or feeder. Thus, while the hopper and feed device for the dry material is a part of our invention as connected with the mixing of gypsum slurry, yet the hopper portion alone with its feed mechanism as modified according to Figures 6 or 7, or with an even greater number of divisions, is useful in any industry where it is desired to blend dry materials in certain predetermined proportions. In some industries where it is desired to blend a number of dry materials and then add water or some other liquid to them, our machine with a hopper according to Figure 7, or with any larger number of divisions, would be useful.

Figure 8:
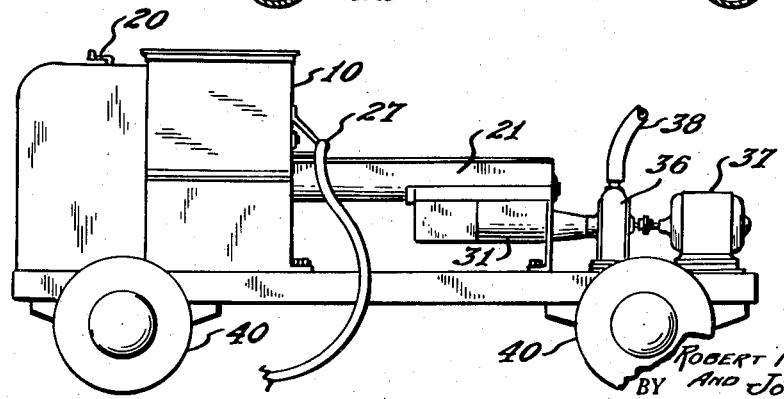
Figure 8 is a general elevational view of a machine according to our invention mounted on wheels.

It will be noted that the mixing machine can be arranged for portable use, where pumping the mixed material, whatever it may be, is not desirable. We have shown in Figure 8 how our entire machine may be mounted on wheels for easy mobility. The wheels are indicated at 40.

While we have described our machine and our process primarily in connection with the laying of monolithic slabs of gypsum composition on a previously prepared deck, it will be clear that certain parts of the machine, and even the entire machine, will have utility in other fields, such as food processing, chemical mixing, blending of oils and pigments, etc. It will also be clear that numerous modifications may be made without departing from the spirit of our invention. For these reasons we do not intend to limit ourselves in any way except as set forth in the claims which follow.

Having now fully described our invention, what we claim as new and desire to secure by Letters Patent is:

1. A machine for continuously preparing calcined gypsum for use, comprising a hopper for said calcined gypsum having a shrouded delivery opening, a feeding means operative to deliver said calcined gypsum continuously through said delivery opening, propelling means positioned to receive said delivered calcined gypsum from said delivery opening, and to convey it along a path, means associated with said propelling means for producing in said calcined gypsum a high state of turbulence, and means for adding water of crystallization to said calcined gypsum while the latter is in said state of turbulence.

2. A machine according to claim 1, in which the means for adding said water of crystallization comprises a pressure jet.

3. A machine according to claim 2, in which a metering device is provided for said jet, and said metering device is driven in timed relation to said feeding means.

4. A machine according to claim 1, having means for adding free air to said gypsum while it is in a state of turbulence.

5. A machine for continuously preparing and delivering gypsum slurry for the laying of monolithic deck slabs and the like, comprising a hopper for the dry gypsum, a delivery opening at the bottom thereof, means for insuring a continuous and constant metered delivery of said gypsum through said opening, a trough positioned to receive said delivered gypsum, screw means in said trough for continuously feeding said gypsum therealong at a uniform rate, means associated with said screw means for creating in said gypsum a high state of turbulence, and means for adding to said turbulent gypsum its water of crystallization to produce a gypsum slurry.

6. A machine according to claim 5, in which the means for creating said turbulence comprises a series of members secured to the flight of said screw means and extending from both sides of said flight substantially normal to the plane thereof.

7. A machine according to claim 6, in which the means for adding the water of crystallization comprises a series of pressure jets.

8. A machine according to claim 7, in combination with a pump fed thereby, said pump serving to deliver continuously said prepared gypsum slurry to a point removed from said machine.

9. A machine according to claim 8, in which said pump is a variable speed pump.

10. In combination, a machine for preparing a gypsum slurry for use, a pump disposed at the discharge end of said machine for continuously delivering said gypsum slurry in its fluid state to a point where it is to be used, and a reservoir between said preparing machine and said pump.

11. In combination, a mixing receptacle having a discharge, for receiving dry, calcined gypsum, and water, mixing and propelling means in said receptacle to intimately mix and rapidly propel through said discharge, the slurry formed by said gypsum and water, a pump disposed at the discharge side of said receptacle for continuously delivering said gypsum slurry in its fluid state to a point where it is to be used, and a reservoir between said mixing receptacle and said pump.

12. In combination, a mixing receptacle having a discharge, for receiving dry, calcined gypsum, and water, mixing and propelling means in said receptacle to intimately mix and rapidly propel through said discharge, the slurry formed by said gypsum and water, a pump disposed at the discharge side of said receptacle for continuously moving said gypsum slurry in its fluid state, flexible means for conducting said fluid gypsum slurry to a point where it is to be used, and a reservoir between said mixing receptacle and said pump.

13. The combination of claim 10, in which agitating means are provided in said reservoir.

14. The combination of claim 13, in which said agitating means comprise propellers.

15. A machine for continuously preparing and delivering gypsum slurry for the laying of monolithic deck slabs and the like, comprising a hopper for the dry gypsum, a delivery opening at the bottom thereof, means for insuring a continuous and constant delivery of said gypsum through said opening, a trough positioned to receive said delivered gypsum, feeding means in said trough for continuously feeding said gypsum therealong at a uniform rate, means associated with said feeding means for creating in said gypsum a high state of turbulence, means for adding to said turbulent gypsum its water of crystallization to produce a gypsum slurry, a reservoir at the end of said trough to receive said gypsum slurry therefrom, and a pump, said pump receiving said gypsum slurry from said reservoir for delivery to the point of use.

16. A machine according to claim 15, in which said reservoir is below said trough, said gypsum slurry dropping from said trough into said reservoir.

17. A machine according to claim 16, in which said reservoir is provided with agitating means.

18. A machine according to claim 15, in which said reservoir is a continuation of said trough.

19. A machine according to claim 18, in which said reservoir is provided with agitating means coaxial with said feeding means.

ROBERT F. ZIMMERMAN.
    JOHN H. HOGE.

REFERENCES CITED

The following references are of record in the file of this patent:

UNITED STATES PATENTS

| Number | Name | Date |
|---|---|---|
| 1,247,153 | Roberts | Nov. 20, 1917 |
| 1,448,608 | Tybout | Mar. 13, 1923 |
| 1,492,061 | Averill | Apr. 29, 1924 |
| 1,531,594 | Carozza | Mar. 31, 1925 |
| 1,613,682 | Tuttle | Jan. 11, 1927 |
| 1,731,953 | Thomson | Oct. 15, 1929 |
| 1,987,243 | Madsen | Jan. 8, 1935 |
| 2,090,685 | Krause et al. | Aug. 24, 1937 |
| 2,142,588 | Medlet et al. | Jan. 3, 1939 |
| 2,298,258 | Ziler | Oct. 6, 1942 |
| 2,464,523 | Muenech | Mar. 15, 1949 |

FOREIGN PATENTS

| Number | Country | Date |
|---|---|---|
| 19,321 | Great Britain | Sept. 12, 1908 |